US010774808B2

(12) United States Patent
Achenbach et al.

(10) Patent No.: US 10,774,808 B2
(45) Date of Patent: Sep. 15, 2020

(54) METHOD OF OPERATING A WIND TURBINE WITHOUT GRID CONNECTION AND WIND TURBINE

(71) Applicant: Adwen GmbH, Bremerhaven (DE)

(72) Inventors: Patrick Achenbach, Rheine (DE); Wilhelm Janssen, Saterland (DE)

(73) Assignee: ADWEN GMBH, Bremerhaven (DE)

( * ) Notice: Subject to any disclaimer, the term of this patent is extended or adjusted under 35 U.S.C. 154(b) by 25 days.

(21) Appl. No.: 15/546,044

(22) PCT Filed: Jan. 29, 2016

(86) PCT No.: PCT/EP2016/051972
§ 371 (c)(1),
(2) Date: Jul. 25, 2017

(87) PCT Pub. No.: WO2016/120467
PCT Pub. Date: Aug. 4, 2016

(65) Prior Publication Data
US 2018/0335014 A1    Nov. 22, 2018

(30) Foreign Application Priority Data

Jan. 30, 2015 (EP) ..................... 15153335

(51) Int. Cl.
*F03D 7/02* (2006.01)
*F03D 9/11* (2016.01)
(Continued)

(52) U.S. Cl.
CPC ........... *F03D 7/026* (2013.01); *F03D 7/0204* (2013.01); *F03D 7/0224* (2013.01);
(Continued)

(58) Field of Classification Search
CPC . F03D 7/026; F03D 9/11; F03D 13/30; F03D 9/255; F03D 7/0204; F03D 7/0264;
(Continued)

(56) References Cited

U.S. PATENT DOCUMENTS 7,141,887 B2    11/2006 Okubo et al.
7,394,166 B2 *   7/2008 Teichmann ............... H02J 3/38
                                                                290/44
(Continued)

FOREIGN PATENT DOCUMENTS

CN      103683252 A     3/2014
EP        0115859 A1    8/1984
(Continued)

OTHER PUBLICATIONS

International Preliminary Report on Patentability for PCT Application No. PCT/EP2016/051972 dated Aug. 10, 2017.
(Continued)

*Primary Examiner* — Tulsidas C Patel
*Assistant Examiner* — Joseph Ortega
(74) *Attorney, Agent, or Firm* — Schmeiser, Olsen & Watts LLP (57) ABSTRACT

A wind turbine comprises a permanent magnet synchronous generator, a main converter, a main converter controller, a wind turbine master controller and an electrical power supply stage comprising an electrical energy storing device. A startup of the wind turbine can be performed using electrical energy from the electrical energy storing device independent from a power supplying grid and/or a combustion engine. After startup, the wind turbine can be operated in an island mode by controlling an intermediate voltage of the main converter by the main converter controller and retrieving power from the synchronous generator independent from the electrical energy storing device.

16 Claims, 4 Drawing Sheets

(51) Int. Cl.
*F03D 9/25* (2016.01)
*F03D 13/30* (2016.01)

(52) U.S. Cl.
CPC .............. *F03D 7/0264* (2013.01); *F03D 9/11* (2016.05); *F03D 9/255* (2017.02); *F03D 13/30* (2016.05); F05B 2220/7068 (2013.01); F05B 2220/70642 (2013.01); F05B 2230/60 (2013.01); F05B 2230/70 (2013.01); F05B 2240/95 (2013.01); F05B 2270/107 (2013.01); F05B 2270/1032 (2013.01); F05B 2270/321 (2013.01); F05B 2270/327 (2013.01); F05B 2270/328 (2013.01); F05B 2270/329 (2013.01); Y02E 10/723 (2013.01); Y02E 10/725 (2013.01); Y02E 10/727 (2013.01); Y02P 70/523 (2015.11)

(58) Field of Classification Search
CPC .......... Y02P 70/523; F05B 2220/70642; F05B 2220/7068; F05B 2230/60; F05B 2230/70; F05B 2240/95; F05B 2270/1032; F05B 2270/107; F05B 2270/321; F05B 2270/327; F05B 2270/328; F05B 2270/329; Y02E 10/723; Y02E 10/725; Y02E 10/727
See application file for complete search history.

(56) References Cited

U.S. PATENT DOCUMENTS

| | | | |
|---|---|---|---|
| 7,952,232 B2* | 5/2011 | Burra | H02J 9/062 307/64 |
| 8,664,788 B1* | 3/2014 | Wagoner | F03D 7/0244 290/44 |
| 2004/0145188 A1* | 7/2004 | Janssen | H02J 9/00 290/44 |
| 2005/0253396 A1 | 11/2005 | Mikhail et al. | |
| 2006/0163881 A1* | 7/2006 | Bucker | H02P 9/007 290/44 |
| 2007/0189900 A1* | 8/2007 | Rogall | F03D 7/0248 416/132 B |
| 2008/0030027 A1* | 2/2008 | Erdman | F03D 7/0224 290/40 R |
| 2010/0013224 A1 | 1/2010 | Edenfeld | |
| 2011/0089693 A1* | 4/2011 | Nasiri | F03D 7/0272 290/44 |
| 2012/0306202 A1* | 12/2012 | Takahashi | F03D 7/048 290/44 |
| 2013/0184884 A1* | 7/2013 | More | H02J 3/14 700/291 |
| 2014/0103653 A1* | 4/2014 | Ubben | F03D 7/028 290/44 |
| 2014/0225369 A1* | 8/2014 | Bodewes | F03D 7/04 290/44 |
| 2015/0381089 A1* | 12/2015 | Tarnowski | H02J 3/386 307/84 |
| 2017/0197690 A1* | 7/2017 | Nakamura | B63B 21/20 |

FOREIGN PATENT DOCUMENTS

| | | | | |
|---|---|---|---|---|
| EP | 1832743 | A1 | 9/2007 | |
| EP | 1909371 | A2 * | 4/2008 | ............... H02J 3/38 |
| EP | 1909371 | A2 | 4/2008 | |
| EP | 1961957 | A2 | 8/2008 | |
| EP | 2565443 | A1 | 3/2013 | |

OTHER PUBLICATIONS

Search report from EP counterpart application (EP15153335).
International Search Report and Written Opinion from PCT counterpart (PCT/EP2016/051972).
Non-English Chinese Office Action for Application No. 201680005743.5, dated Apr. 3, 2019.
European Opposition to Application No. EP15153335.3, dated Jun. 27, 2018.
Non-English Japanese Decision to Grant for Application No. 2017-558778, dated Jun. 24, 2019.
English Translation of Korean Notice of Allowance for Application No. 1020177023560, dated Jul. 2, 2019.

* cited by examiner

METHOD OF OPERATING A WIND TURBINE WITHOUT GRID CONNECTION AND WIND TURBINE

CROSS-REFERENCE TO RELATED APPLICATIONS

This application is the U.S. national phase of PCT/EP2016/051972, filed 29 Jan. 2016, which claims priority to EP 15 153 335.3, filed 30 Jan. 2015.

FIELD OF THE INVENTION

The present invention relates to a method of operating a wind turbine, a method of manufacturing a wind turbine, a wind turbine, and a wind park.

BACKGROUND

It is generally known in the art to operate a wind turbine in an island mode. The term "island mode" relates to an operation without grid connection (grid-loss; grid failure) in which the wind turbine needs to operate independently from the grid.

Another general challenge for wind turbines, in particular off-shore wind turbines, relates to the first startup (or commissioning) of the wind turbines. In order to start normal operation, the wind turbine requires a certain amount of energy which can be supplied through the grid to which the wind turbine is connected. However, the grid (or the power supply through the grid) is often not yet available when the wind turbine is assembled and ready for startup. This can lead to damage of the wind turbine due to idleness.

In order to independently perform a startup or black start and avoid idleness, diesel generators can be provided which supply the necessary electrical energy to the wind turbine. However, this requires a large amount of fuel that needs to be carried to the wind turbine.

SUMMARY

It is an object of the invention to provide a method of operating a wind turbine, a method of manufacturing a wind turbine, a wind turbine and a wind park which ensure that the wind turbine can perform a startup or black start without grid connection or combustion generators.

In an aspect of the invention, a method of operating a wind turbine is provided. The wind turbine comprises a permanent magnet (PM) synchronous generator, a main converter, a main converter controller, a wind turbine master controller, and an electrical power supply stage (UPS). The electrical power supply stage can, for example be an uninterruptible power supply (UPS). The electrical power supply stage can comprise an electrical energy storing device. In a first aspect, a (first) startup or black start of the wind turbine can (exclusively) be performed using electrical energy from the electrical energy storing device independent from a power supplying grid and/or a combustion generator. The wind turbine can be operated in an island mode. In this island mode, the intermediate voltage (DC-link) of the main converter is controlled by the main converter controller. In other words, the internal electrical power supply is controlled by the main converter controller and not by the master controller of the wind turbine. Furthermore, in the island mode, power is retrieved from the PM synchronous generator and used for supplying the necessary internal components of the wind turbine. This means that the electrical energy storing device may only be used during startup or a black start. It is not required for operating the wind turbine in the island mode.

The electrical energy storing device can be charged in the island mode. This provides that the energy storing device is always charged after startup to store sufficient electrical energy to perform a subsequent startup and/or to ride through periods of lull wind (while waiting for a wind status).

The necessary internal components that have to be powered during startup or black start can be referred to as a sub system or auxiliary operating system. This sub system or auxiliary operating system can advantageously be internal to the wind turbine.

The auxiliary operating system provides the possibility to operate, for example other sub systems like the yaw drive of the wind turbine such that the nacelle can be positioned according to the wind direction. The sub system can also be used to power subsystems like the pitch system and/or air conditioning system.

According to a further aspect, the wind turbine is stopped and/or brought in a safe operating state before the next black start is performed. In other words, the step of transitioning from normal power production of the wind turbine to the island mode is performed in the safe operating state and/or when the wind turbine is stopped. As the wind turbine does not use additional power conversion hardware compared to a "standard wind turbine", the island mode will not be entered seamless after grid fault. First, the turbine has to be stopped (or brought into safe operation state as, for example a low-rpm-idle-mode). The transition from normal power production to island mode can then be performed in this switch off state only.

Advantageously, the torque of the wind turbine is controlled by the main converter controller during island mode. This means that the torque is not controlled by the master controller of the wind turbine but by the main converter controller of the wind turbine.

The DC link voltage of the wind turbine can then also be controlled by the main converter controller. This can be done by field weakening of the PM synchronous generator and/or brake chopper control. The generator side converter can then only supply measurement data for computation.

Generally, the functionality of the wind turbine controller, which is responsible for controlling the rotational speed and pitch of the rotor blades, and the functionality of the main converter controller that is responsible for controlling the torque can both be limited during island mode.

Advantageously, in island mode, pitch control of the rotor blades of the wind turbine can be limited to values outside a tolerance band of rotor rotations per minute (nR) and/or generator rotations per minute (nG) such that the pitch is only adjusted below a minimum value of rotations per minute and above a maximum value of rotations per minute.

The minimum value for rotor rotations can be 6 rpm and the maximum value can be 14 rpm. The target value can be 10 to 11 rpm. The minimum value for generator rotations per minute can be 60 rpm and the maximum can be 140 rpm. The target value can be 100-110 rpm. The rpm values for the rotor and the generator are related to each other by the gearbox ratio. In this example, the gearbox ration is about 10.

In this aspect of the invention, the pitch of the rotor blades may advantageously only be adjusted if the number of rotations per minute leaves the tolerance band between the respective minimum and maximum value of rotations. This is done irrespective of the target value.

The wind turbine behaves similar to "high rpm idling" mode but including a variable power offset dependent on the requirements of the auxiliary operating system and the powered sub systems. The term "high rpm idling mode" means that the turbine operational state is an idling situation with a rotational speed close to normal load operation speed. In this mode, the normal loss of the generator down to the transformer can be 100 kW to 200 kW, and for specific wind turbines 80 kW. The loss of the gear may amount to 40 kW to 60 kW. This means that the total loss without the auxiliary operating system and any other sub systems can amount to round about 120 kW to 140 kW. Accordingly, a range of about 100 kW to 200 kW, in particular a value of 150 kW power is necessary in rpm idling mode. Dependent on the additionally powered sub systems (including the auxiliary operating system) the offset can have the following values:

50 kW to 70 kW in stationary operation;
100 kW to 120 kW for powering the yaw drive system, or
240 kW to 260 kW for starting the yaw drive system (transient).

In other words, in "island mode", the turbine is operated similar to high rpm idling (=idling with a rotational speed close to normal load operation). Closed loop rotor speed control is carried out. Depending on the actual auxiliary power demand (of sub systems and auxiliary operating system) in island mode there will be a load offset in the range of e.g. 50 kW-300 kW compared to "normal" idling at high rpm.

The electrical energy storage device can be a battery, in particular a rechargeable battery. The minimum capacity of the electrical energy storage device can be 50 kWh. In an embodiment the electrical energy storage device can comprise lead acid batteries. The electrical energy storage device can be configured to store enough electrical energy for bridging at least one entire day (24 h) calm period. Due to the large battery buffer the wind turbine can enter the island mode hours or even days after the stop without any dependency on external energy.

The present invention also provides a wind turbine (in particular off shore wind turbine) comprising a permanent magnet (PM) synchronous generator, a main converter, a main converter controller, a wind turbine master controller, and an energy storage device. The wind turbine can be configured to perform a first startup of the wind turbine independent from an external power supply by retrieving power from the energy storage device and subsequently transitioning into an island mode, wherein, in the island mode the main converter controller is configured to control torque and/or the an intermediate voltage (DC link voltage) of the main converter. Accordingly, the wind turbine according to these aspects of the invention can perform a startup or black start without external energy.

Furthermore, in the island mode, the main converter controller can be configured to control the DC link voltage by field weakening of the PM synchronous generator and/or brake chopper control.

Advantageously, in the island mode, the turbine master controller can be configured to only adjust a pitch angle of the rotor blades in response to a rotational speed of the generator and/or of the rotor and/or to cease sending torque requests to the main converter controller.

In an aspect, the wind turbine may further be configured to only perform pitch control of the wind turbine in island mode, if the rotor rotations per minute (nR) and/or generator rotations per minute (nG) is/are outside a tolerance range.

The present invention also provides a wind park comprising one or more wind turbines according to aspects and embodiments of the invention.

The present invention also provides a method of manufacturing a wind turbine. The method advantageously comprises the following steps: a complete burn-in of the wind turbine (preferably on-shore), disassembling of the wind turbine, re-assembling of the wind turbine at the final destination (advantageously off-shore), startup or black start of the wind turbine without connection to the grid only based on electrical energy supplied by the UPS or energy storage device, and subsequently controlling the DC-link of the main converter by the main converter controller. Accordingly, the present invention provides a method of manufacturing a wind turbine including hot commissioning. This means that the wind turbine is initially assembled at a first location, for example on shore and then operated under full load (burn-in). The energy storage device is of course fully charged. Once the wind turbine is ready for operation, it is disassembled and carried to a second location, for example the final destination (for example off shore) and re-assembled.

BRIEF DESCRIPTION OF THE DRAWINGS

Further aspects and features of the invention ensue from the following description of preferred embodiments of the invention with reference to the accompanying drawings, wherein.

DETAILED DESCRIPTION

Figure 1:
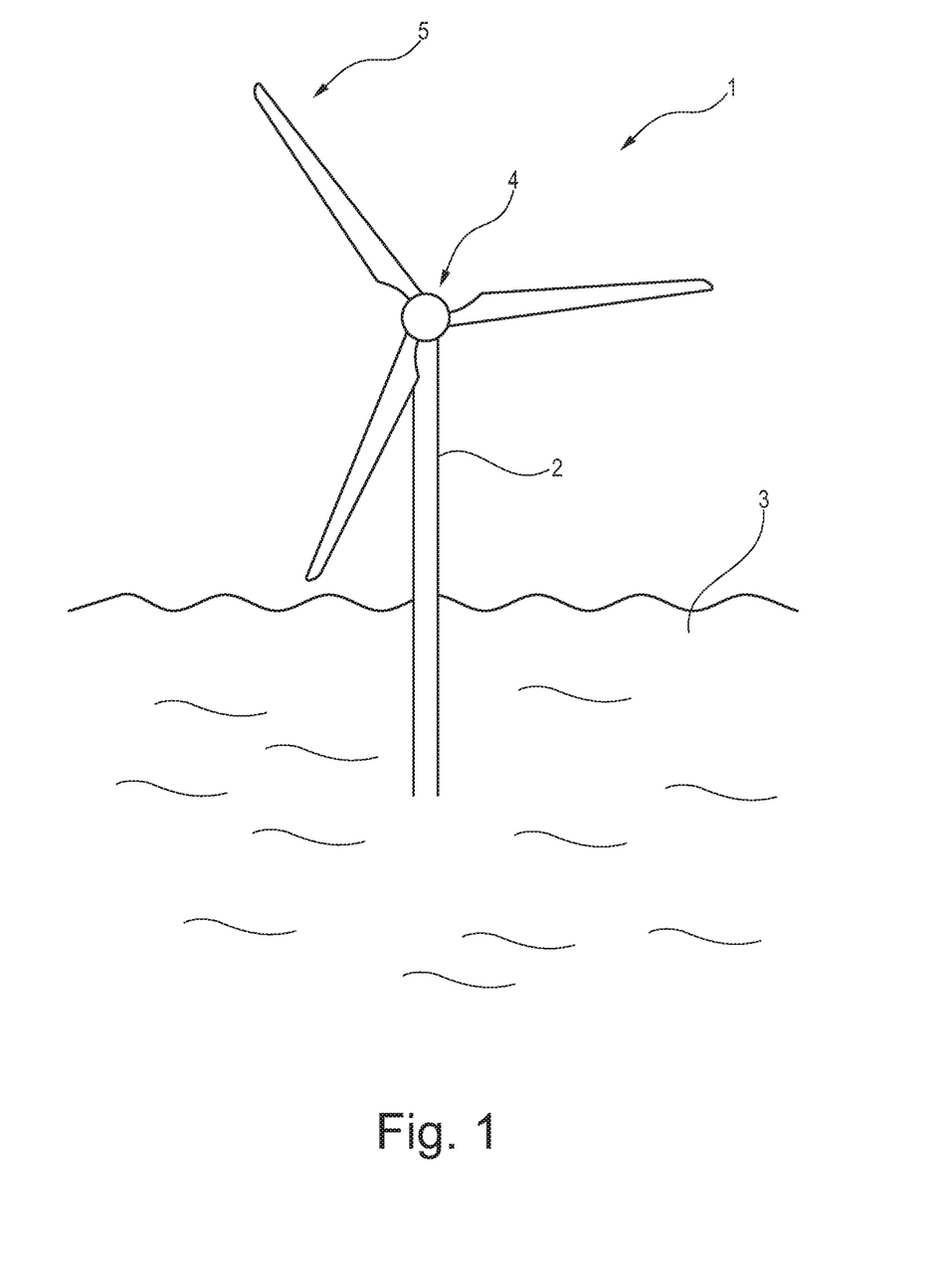
FIG. 1 is a simplified schematic of a wind turbine according to an embodiment of the invention.

FIG. 1 shows a simplified wind power plant or wind turbine 1 according to an embodiment of the invention. The wind power plant or wind turbine 1 comprises a supporting structure 2, which is based on a suitable foundation in the sea 3. By way of an example only, the wind power plant or wind turbine 1 is an offshore wind generator. The rotor hub 4 carries a plurality of rotor blades 5. A nacelle (not visible) is arranged at the top of the supporting structure 2, which may be a tower, for example.

Figure 2:
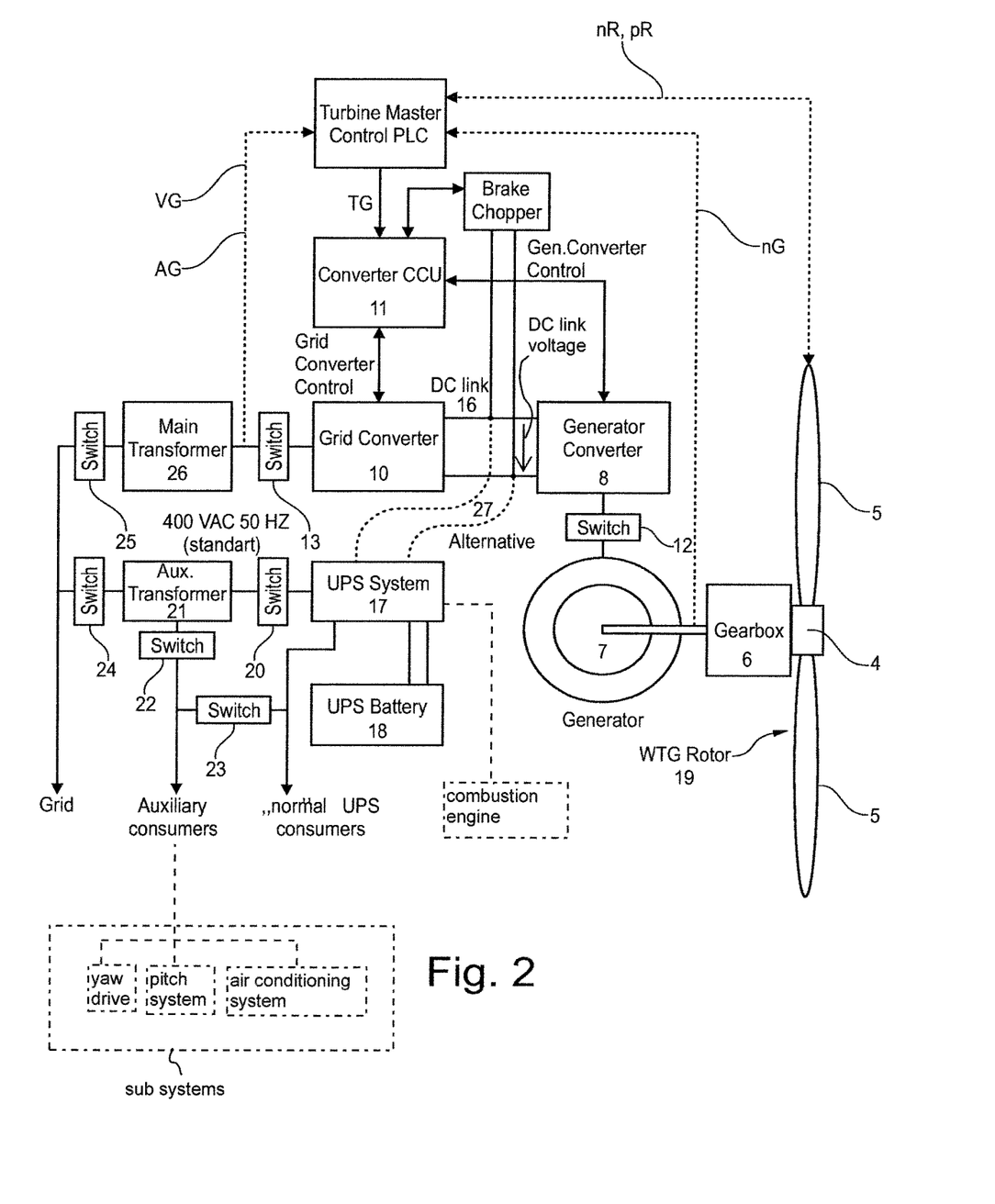
FIG. 2 is a simplified diagram illustrating normal operation and components of wind turbine to which the present invention applies.

FIG. 2 is a simplified diagram illustrating operation and components of the wind turbine 1 to which the present invention applies. FIG. 2 is a simplified illustration serving to explain a normal operation or normal energy production mode of the wind turbine 1.

The wind turbine 1 comprises rotor blades 5 and a rotor hub 4. There are further a gearbox 6, a permanent magnet synchronous generator 7, a main converter (or generator converter) 8, a wind turbine master controller 9, a grid converter 10, and a main converter controller 11. There is further a first switch 12 coupled between the PM synchronous generator 7 and the main converter 8, and a second switch 13 coupled between the grid converter 10 and a grid or main transformer 26.

The turbine master controller 9 is configured and coupled to send a desired torque value (torque request) TG to the main converter controller 11. The main converter controller 11 is configured to communicate with, and to control, main converter 8 and grid converter 10. The connection between the main converter 8 and grid converter 10 is referred to as direct current (DC) link 16.

Main converter 8 is configured to adjust the voltage and the current to match the resulting turbine power. Grid converter 10 (also referred to as grid side converter) is configured to control the DC link voltage and ensures the load equilibrium.

There is also a brake (or braking) chopper 15 coupled to the DC link 16. Braking chopper 15 is an electrical switch that limits the DC link voltage by switching the braking energy to a resistor where the braking energy is converted to heat.

Turbine master controller 9 also monitors and controls the rotation of a rotor 19 (rotor blades 5 and hub 4) and the pitch of the rotor blades 5. The pitch or pitch angle is indicated by pR and the number of rotations per minute (rpm) of the rotor 19 is indicated by nR. Pitch signal pR includes a desired pitch angle and a current pitch angle value of the rotor blades 5. Turbine master controller 9 further monitors and controls the number of rotations per minute (rpm) of the generator which is indicated by nG. Turbine master controller 9 also monitors the voltage VG and current VA at the grid or main transformer 26.

Finally, there is an electrical energy supply 17 including an electrical energy storage device 18. In one example, the electrical energy supply 17 can be an uninterruptible power supply (UPS). The electrical energy storage device 18 can be a battery or multiple batteries for example, in particular rechargeable batteries. In an embodiment, the electrical energy storage device 18 can comprise or consist of one or more lead acid batteries having a minimum capacity of 50 kWh. The electrical energy storage device 18 can be configured to store enough electrical energy for bridging at least one entire day (24 h) of a calm period.

The UPS system or energy supply 17 can be coupled through a switch 20 to an auxiliary transformer 21. Auxiliary transformer 21 can be coupled through a switch 24 to the grid. Grid converter 10 is coupled through switch 13 to main transformer 26 which is coupled through a switch 25 to the grid. Auxiliary transformer 21 is coupled to through switch 22 to any auxiliary power consumers (sub systems). Furthermore, UPS system 17 can be coupled to the normal UPS power consumers. Between the output of switch 22 and the output of the UPS system 17 there is another switch 23.

In an alternative embodiment, the UPS system 17 may also be coupled to the DC link via a direct connection 27 which is only shown in dashed lines.

Figure 3:
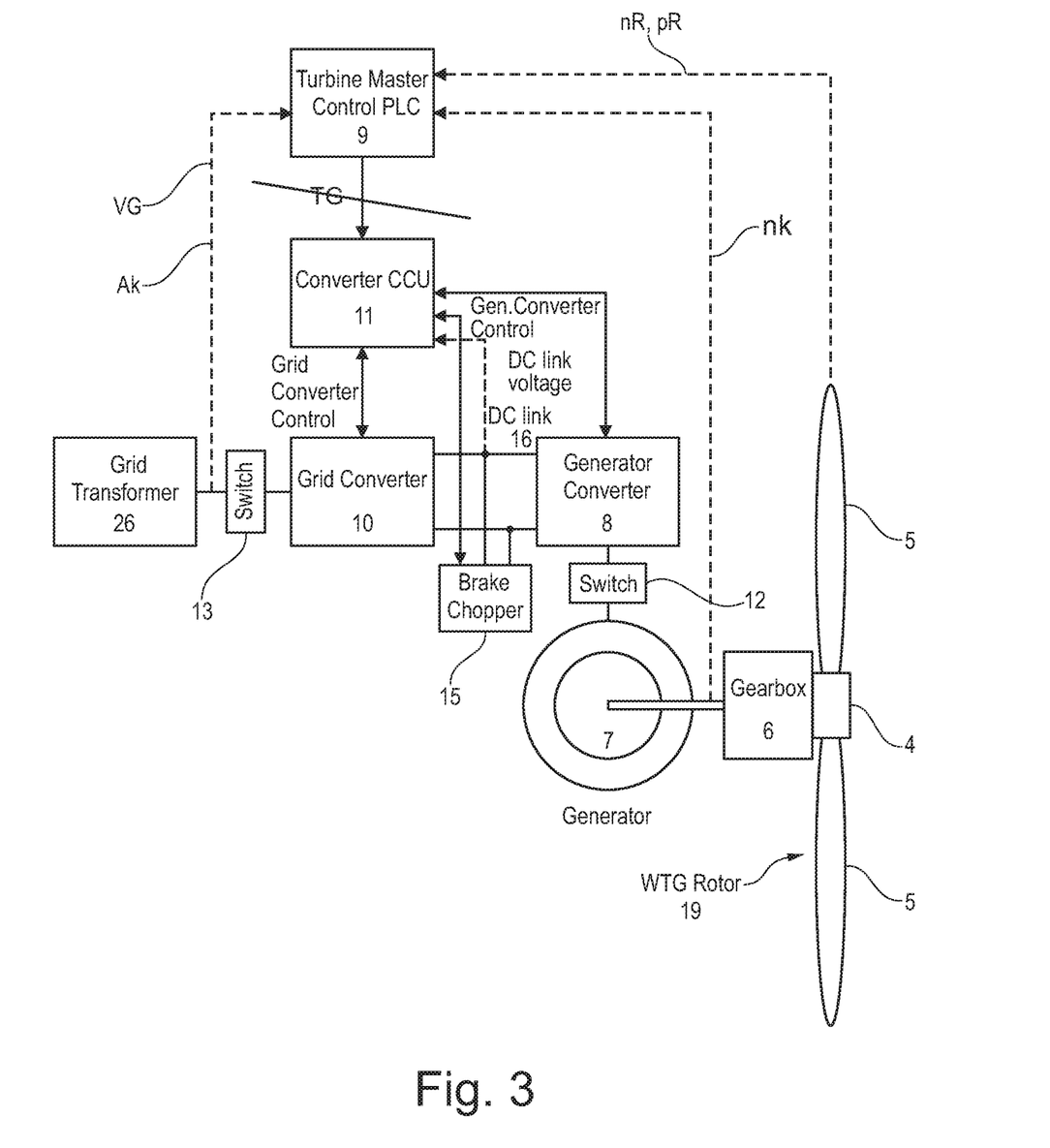
FIG. 3 is a simplified diagram illustrating an island mode according to an embodiment of the present invention.

FIG. 3 is a simplified block diagram and illustration of the island mode of the wind turbine 1 according to aspects and embodiments of the invention. In the island mode, the turbine master controller 9 ceases to send torque requests TG to the main converter controller 11. In the island mode, the turbine master controller 9 still monitors the rotor speed nR (number of rotations of the rotor 19 per minute) and the number of rotations of the generator nG (number of rotations of the generator 7 per minute) and controls and adjusts the pitch or pitch angle pR of the rotor blades 5. The main converter controller 11 controls the voltage at the DC link 16. The grid converter 10 operates like a UPS and generates a fixed 50 Hz voltage for internal supply.

A startup or black start of the wind turbine 1 can be performed using, in particular exclusively, electrical energy from the UPS 17, in particular from the electrical energy storing device 18 independent from a power supplying grid and/or a combustion generator. The wind turbine can subsequently be operated in the island mode. In this island mode, the intermediate voltage (DC-link 16) of the main converter 8 is controlled by the main converter controller 11. In other words, the internal electrical power supply is controlled by the main converter controller 11 and not by the master controller 9 of the wind turbine 1. In the island mode, power is retrieved from the PM synchronous generator 7 and used for supplying all the necessary internal components of the wind turbine. This means that the power supply 17, including electrical energy storing device 18 (as shown in FIG. 2), may only be used during startup or a black start. Afterwards, the UPS or electrical energy storing device it is not required for operating the wind turbine 1 in the island mode.

The electrical energy storing device 18 (shown in FIG. 2) can be charged in the island mode. This ensures that the energy storing device 18 is always re-charged after startup to store sufficient electrical energy to perform a subsequent startup or black start.

The necessary internal components that have to be powered during startup can be referred to as sub systems and the auxiliary operating system of the wind turbine. The sub systems and the auxiliary operating system can be internal to the wind turbine. The auxiliary operating system provides the possibility to operate other sub systems like, for example the yaw drive (not shown) of the wind turbine such that the nacelle of the wind turbine 1 can be positioned according to the wind direction. The auxiliary operating system can also be used to power the pitch drive or an air conditioning system.

As the wind turbine does not use additional power conversion hardware compared to a "standard wind turbine", the island mode may not be entered seamlessly after grid fault. The wind turbine 1 has to be stopped (or brought into safe operation state as, for example a low-rpm-idle-mode). The transition from normal power production to island mode can then be performed in this switch off state only.

The torque of the wind turbine is controlled by the main converter controller 11 during island mode. This means that the torque is not controlled by the master controller 9 of the wind turbine but by the main converter controller 11 of the wind turbine.

The DC link 16 voltage of the wind turbine 1 can then also be controlled by the main converter controller 11. This can be done by field weakening of the PM synchronous generator 7 and/or brake chopper control of the brake chopper 15.

Figure 4:
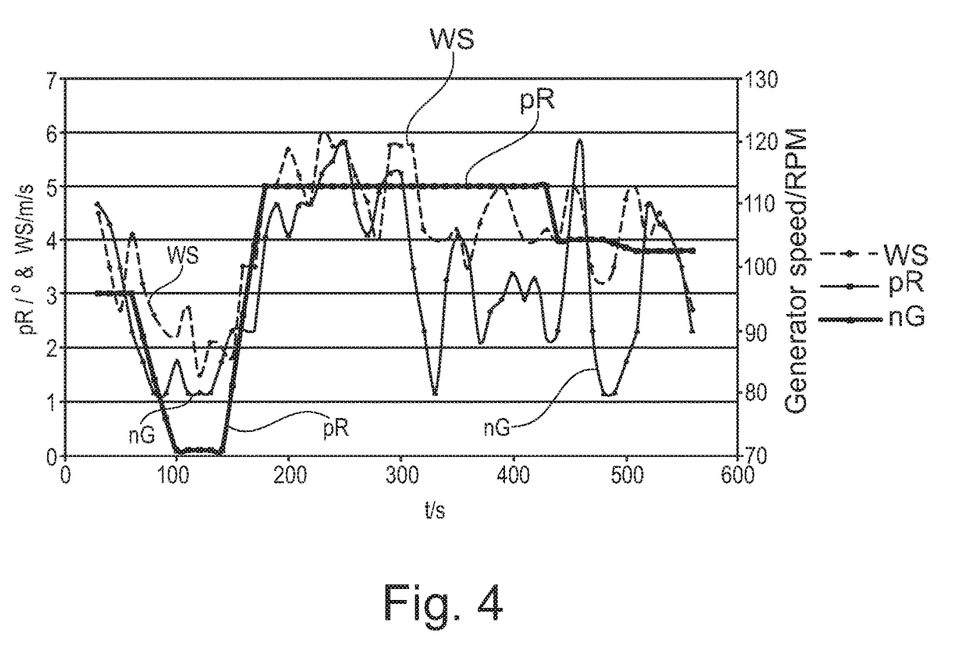
FIG. 4 is a diagram indicating a pitch control scheme according to an embodiment of the invention.

FIG. 4 is a diagram indicating a pitch control scheme in the island mode according to an embodiment of the invention. Accordingly, in the island mode, the pitch angle pR of the rotor blades is only adjusted if the number of rotations nG of the generator 7 and/or the number of rotations nR of the rotor 19 leaves a certain range. The diagram indicates the wind speed WS in m/s, the pitch angle pR of the rotor blades 5 in degrees, and the number of rotations nG of the generator 7 in rpm (also referred to as generator speed) over time in seconds. In this embodiment, the upper limit for nG is 120 rpm and the lower limit is 80 rpm. The pitch angle is only adapted if nG exceeds 120 rpm or is drops below 80 rpm. It can be seen that the pitch angle pR remains constant over periods of several hundreds of seconds. This kind of tolerance band control has several advantages. The activity of the pitch adjustment is reduced which reduces use of the pitch adjustment system (pitch drive, gears etc.), the number of changes of the load conditions is reduced (thereby also reducing wear of the wind turbine), the amount of energy consumed by the pitch drive system is reduced, and load on the wind turbine is generally reduced.

In other embodiments, the minimum value nR for rotor 19 rotations can be 6 rpm and the maximum value for nR can be 14 rpm. The target value for nR can be 10 to 11 rpm. The minimum value nG for generator rotations per minute can be 60 rpm and the maximum for nG can be 140 rpm. The target value for nG can be 100-110 rpm. The rpm values for the rotor and the generator are related to each other by the gear transmission ratio of the gearbox 7. In this example, the gearbox ratio is about 10:1

The electrical energy storage device 18 can be a battery, in particular a rechargeable battery. The minimum capacity of the electrical energy storage device 18 can be 50 kWh. In an embodiment, the electrical energy storage device can comprise lead acid batteries (or another advantageous battery technology, like e.g. lead crystal). Due to the large battery buffer, the wind turbine can enter the island mode hours or even days after the stop without any dependency on external energy.

In the island mode, the wind turbine behaves similar to "high rpm idling" mode but including a variable power offset dependent on the requirements of the auxiliary operating system and the powered sub systems. The term "high rpm idling mode" means that the turbine operational state is an idling situation with a rotational speed close to normal load operation speed. In this mode, the normal loss of the generator down to the transformer can be 100 kW to 200 kW, and for specific wind turbines 80 kW. The loss of the gear may amount to 40 kW to 60 kW. This means that the total loss without the auxiliary operating system and any other sub systems can amount to round about 120 kW to 140 kW. Accordingly, a range of about 100 kW to 200 kW, in particular a value of 150 kW power is necessary in rpm idling mode. Dependent on the additionally powered sub systems (including the auxiliary operating system) the offset can have the following values:

50 kW to 70 kW in stationary operation;
100 kW to 120 kW for continuously powering the yaw drive system, or
240 kW to 260 kW for starting the yaw drive system (transient).

In other words, in "island mode", the turbine is operated similar to high rpm idling (=idling with a rotational speed close to normal load operation). Closed loop rotor speed control is carried out. Depending on the actual auxiliary power demand (of sub systems and auxiliary operating system) in island mode there will be a load offset in the range of e.g. 50 kW-300 kW compared to "normal" idling at high rpm.

Although the invention has been described hereinabove with reference to specific embodiments, it is not limited to these embodiments and no doubt further alternatives will occur to the skilled person that lie within the scope of the invention as claimed.

The invention claimed is:

1. A method of operating a wind turbine, the wind turbine comprising a permanent magnet synchronous generator, a main converter, a main converter controller, a wind turbine master controller, and an electrical power supply stage comprising an electrical energy storing device, wherein the method comprises:
    performing a startup of the wind turbine using electrical energy from the electrical energy storing device independent from at least one of a power supplying grid and a combustion engine;
    operating the wind turbine in an island mode by:
        ceasing a sending of torque requests to the main converter controller from the wind turbine master controller;
        controlling a DC link voltage of the main converter by the main converter controller;
        retrieving power from the permanent magnet synchronous generator independent from the electrical energy storing device after startup;
        controlling torque of the wind turbine by the main converter controller instead of the wind turbine master controller; and
        adjusting a pitch angle of rotor blades in response to a rotational speed of the permanent magnet synchronous generator and of a rotor in the island mode by the wind turbine master controller.

2. The method according to claim 1 further comprising: charging the electrical energy storing device in the island mode.

3. The method according to claim 1, further comprising: powering a sub system which is internal to the wind turbine by the electrical energy storage device during startup.

4. The method according to claim 3, wherein the sub system is at least one of a yaw drive to position a nacelle according to wind direction, and a pitch system for adjusting rotor blades, and/or an air conditioning system.

5. The method according to claim 1, further comprising: at least one of stopping the wind turbine and bringing the wind turbine in a safe operating state after a grid fault before performing a subsequent startup.

6. The method according to claim 1, further comprising: controlling the DC link voltage by the main converter controller by field weakening of at least one of the permanent magnet synchronous generator and a brake chopper control.

7. The method according to claim 1, further comprising:
    at least one of limiting pitch control of the wind turbine in the island mode to values outside a tolerance band of rotor rotations per minute (nR) and generator rotations per minute (nG) such that pitch angle is only adjusted below a minimum value of rotations per minute and above a maximum value of rotations per minute.

8. The method according to claim 1, wherein the wind turbine master controller only performs pitch control of the wind turbine in the island mode if rotor rotations per minute (nR) or generator rotations per minute (nG) is/are outside a tolerance range being defined by a minimum value of rotations per minute and a maximum value of rotations per minute.

9. The method according to claim 1, wherein controlling the DC link voltage of the main converter, an internal electrical power supply of the wind turbine is controlled by the main converter controller and not by the wind turbine master controller.

10. A wind turbine comprising:
    a permanent magnet synchronous generator;
    a main converter;
    a main converter controller;
    a wind turbine master controller; and
    an energy storage device, the wind turbine being configured to perform a first startup of the wind turbine independent from an external power supply by retrieving power from the energy storage device and subsequently transitioning into an island mode, wherein, in the island mode a sending of torque requests to the main converter controller from the wind turbine master controller is ceased, and the main converter controller is configured to control torque and/or a DC link voltage of the main converter;

wherein the turbine master controller is configured to adjust a pitch angle of rotor blades in response to a rotational speed of at least one of the permanent magnet synchronous generator and of a rotor in the island mode.

11. The wind turbine according to claim 10, wherein, in the island mode, the main converter controller is configured to control the DC link voltage by field weakening of at least one of the permanent magnet synchronous generator and a brake chopper control.

12. The wind turbine according to claim 10, being further configured to only perform pitch control of the wind turbine in the island mode if rotor rotations per minute (nR) or generator rotations per minute (nG) is/are outside a tolerance range being defined by a minimum value of rotations per minute and a maximum value of rotations per minute.

13. A method of manufacturing a wind turbine comprising:
assembling the wind turbine in a first location;
completely burning-in the wind turbine under full load;
disassembling of the wind turbine at the first location;
re-assembling of the wind turbine at a second location;
performing a startup or black start of the wind turbine without connection to a grid or a combustion generator only based on electrical energy supplied by an electrical energy storing device that is internal to the wind turbine;
operating the wind turbine in an island mode by:
ceasing a sending of torque requests to the main converter controller from the wind turbine master controller;
controlling a DC link voltage of the main converter by the main converter controller;
retrieving power from the permanent magnet synchronous generator independent from the electrical energy storing device after startup;
controlling torque of the wind turbine by the main converter controller instead of the wind turbine master controller; and
adjusting a pitch angle of rotor blades in response to a rotational speed of the permanent magnet synchronous generator and of a rotor in the island mode by the wind turbine master controller.

14. A method of operating a wind turbine having a rotor, the wind turbine comprising a permanent magnet synchronous generator, a main converter, a main converter controller, a wind turbine master controller and an electrical power supply stage comprising an electrical energy storing device, the method comprising:
performing a startup of the wind turbine using electrical energy from the electrical energy storing device independent from a power supplying grid and/or a combustion engine;
operating the wind turbine in an island mode by
controlling an intermediate voltage of the main converter and a torque of the wind turbine by the main converter controller;
adjusting a pitch angle of rotor blades of the rotor in response to a rotational speed of at least one of the generator and the rotor by the wind turbine master controller, wherein the pitch angle is only adjusted, if at least one of the rotor rotations per minute (nR) and the generator rotations per minute (nG) are outside a tolerance band defined by a minimum value of rotations per minute and a maximum value of rotations per minute; and
retrieving power from the permanent magnet synchronous generator independent from the electrical energy storing device after startup.

15. The method of claim 14, further comprising: ceasing a sending of torque requests to the main converter controller from the wind turbine master controller.

16. The method of claim 14, further comprising: controlling torque of the wind turbine by the main converter controller instead of the wind turbine master controller.

* * * * *